J. A. STOCKWELL.

Boots and Shoes.

No. 6,123. Reissued Nov. 3, 1874.

WITNESSES.

J. Wm. Larner,

T. F. Lehmann

INVENTOR.

Jno. A. Stockwell per

F. A. Lehmann, Atty.

THE GRAPHIC CO. PHOTO-LITH. 39 & 41 PARK PLACE, N.Y.

UNITED STATES PATENT OFFICE.

JOHN A. STOCKWELL, OF LYNN, MASSACHUSETTS, ASSIGNOR TO A. N. CLARK, TRUSTEE.

IMPROVEMENT IN BOOTS AND SHOES.

Specification forming part of Letters Patent No. 147,579; dated February 17, 1874; reissue No. 6,123, dated November 3, 1874; application filed September 25, 1874.

*To all whom it may concern:*

Be it known that I, JOHN A. STOCKWELL, of Lynn, in the county of Essex and State of Massachusetts, have invented certain new and useful Improvements in Boots and Shoes; and I do hereby declare that the following is a full, clear, and exact description thereof that will enable others skilled in the art to which it appertains to make and use the same, reference being had to the accompanying drawings and to the letters of reference marked thereon, which form a part of this specification.

My invention relates to improvements in toe-guards for boots and shoes; and consists in taking a strip of leather or other suitable material, bending over its outer edge so as to form a double thickness around the toe, and cutting one or more niches or slots in its inner edge, so that it can be bent into suitable shape to be fitted around the toe to form a guard. It also consists in forming, from a strip of leather, a combined guard and half-sole, as will be more fully described hereafter.

Figure 1:
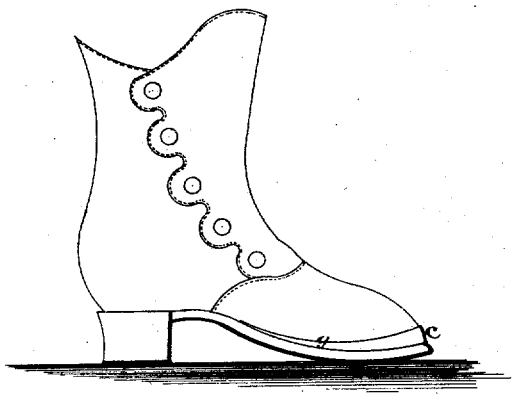
Figure 2:
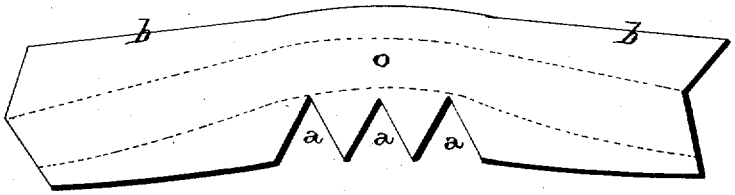
Figure 3:
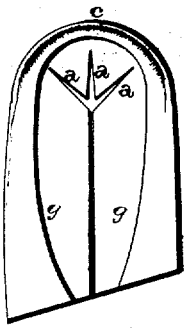

The accompanying drawings represent my invention. I take a single strip of leather, *o*, of suitable length and width, and, after it has been compressed in any manner, so as to be as solid as possible, cut a number of niches or a slot, *a*, in its inner edge. The outer edge, *b*, is then turned inward over the top, so as to form a double thickness, and thus giving to all parts liable to be exposed to sight the finish of the grained surface of the leather, and then the central part *c*, which forms the guard for the front of the toe, is turned upward by bending the strip together, as shown in Fig. 3. The upper, secured to the insole, is then placed inside of the strip thus bent, and the outer sole, *e*, pegged to it, securing the parts all together. The strip of leather may be cut long and wide enough, so that, when bent into proper shape, it will not only form the guard around the front of the toe and sides of the upper, but a half-sole, *g*, also. The insole, to which the upper is fastened, projecting forward and upward, fills the turned-up guard *c*, so as to support and hold it securely in position. The strip being notched or cut in the center, as shown, the tips are thereby made adjustable, so as to be readily adapted to shoes of several different sizes, all of which they fit equally well.

I am aware that in shoes where the upper is made in several parts, the front piece has had its edge notched, so as to be bent into shape, and this I disclaim. My invention consists in forming an adjustable leather guard or tip for boots and shoes, which shall serve as a substitute for the common metallic tip and which will present a neater appearance. The ordinary metallic tip, owing to its appearance, is suitable for children's boots and shoes alone, while mine is equally well adapted for both children and grown persons.

Having thus described my invention, I claim—

1. A tip for boots and shoes, having a folded edge at the toe, and having a part of its inner edge cut away, whereby it can be bent into shape, substantially as set forth.

2. The leather strip *o*, having the niches *a* cut in its inner edge and bent so as to form the guard or tip *c* and half-sole *g*, substantially as shown and described.

In testimony that I claim the foregoing I have hereunto set my hand this 19th day of September, 1874.

JOHN A. STOCKWELL.

Witnesses:
M. E. TUCKER,
T. L. NORRIS.